United States Patent
Wu et al.

(10) Patent No.: US 12,100,364 B2
(45) Date of Patent: Sep. 24, 2024

(54) DISPLAY SYSTEM HAVING ORIGINAL IMAGE BE DISPLAYED WITHOUT COLOR DIFFERENCE

(71) Applicant: APPOTRONICS CORPORATION LIMITED, Guangdong (CN)

(72) Inventors: Chao Wu, Guangdong (CN); Xin Yu, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 25 days.

(21) Appl. No.: 17/593,030

(22) PCT Filed: Feb. 26, 2020

(86) PCT No.: PCT/CN2020/076727
§ 371 (c)(1),
(2) Date: Sep. 3, 2021

(87) PCT Pub. No.: WO2020/177588
PCT Pub. Date: Sep. 10, 2020

(65) Prior Publication Data
US 2022/0180831 A1  Jun. 9, 2022

(30) Foreign Application Priority Data
Mar. 6, 2019  (CN) .................. 201910166102.3

(51) Int. Cl.
*G09G 3/36*   (2006.01)
*G09G 3/00*   (2006.01)
*G09G 3/34*   (2006.01)

(52) U.S. Cl.
CPC ............. *G09G 3/36* (2013.01); *G09G 3/342* (2013.01); *G09G 3/002* (2013.01); *G09G 2320/0626* (2013.01); *G09G 2360/16* (2013.01)

(58) Field of Classification Search
CPC ...... G09G 3/002; G09G 3/006; G09G 3/2003; G09G 3/2092; G09G 3/2096; G09G 3/22;
(Continued)

(56) References Cited

U.S. PATENT DOCUMENTS 10,295,721 B1 *  5/2019  Marason ............... G02B 6/0068
2007/0152926 A1 *  7/2007  Kwon .................. G09G 3/3426
345/82

(Continued)

FOREIGN PATENT DOCUMENTS

CN  1811886 A   8/2006
CN  1991967 A   7/2007
(Continued)

OTHER PUBLICATIONS

ISA China National Intellectual Property Administration, International Search Report Issued in Application No. PCT/CN2020/076727, May 27, 2020, WIPO, 5 pages.
(Continued)

*Primary Examiner* — Keith L Crawley
(74) *Attorney, Agent, or Firm* — McCoy Russell LLP (57) ABSTRACT

A display system includes a light source system including a light source array formed from multiple light source units, and used to emit a light beam, wherein the light source array can be divided into I×J sub-regions; a display unit disposed on an emergent light path of the light source system, and used to modulate a light spot on a surface thereof according to a light spot modulation signal, so as to generate image light; and a dynamic control module for obtaining the light
(Continued)

spot modulation signal and a current modulation signal according to an image signal, dynamically updated chromaticity information and maximum brightness information of the light source units, and a correlation curve between a modulation current and brightness, wherein the current modulation signal is used to adjust the light source system.

20 Claims, 4 Drawing Sheets

(58) Field of Classification Search
CPC ............ G09G 3/34–3426; G09G 3/36; G09G 3/3644; G09G 3/3666; G09G 3/3607; G09G 5/02; G09G 5/026; G09G 5/04; G09G 2320/0242; G09G 2320/0285; G09G 2320/043; G09G 2320/045; G09G 2320/048; G09G 2320/0626–0653; G09G 2320/0666; G09G 2320/0686; G09G 2320/0693; G09G 2360/16; G02F 1/1336–133624
See application file for complete search history.

(56) References Cited

U.S. PATENT DOCUMENTS

| | | | |
|---|---|---|---|
| 2011/0122057 A1 | 5/2011 | Kim et al. | |
| 2014/0035960 A1* | 2/2014 | You | G09G 3/3413 345/102 |
| 2014/0111560 A1* | 4/2014 | Yamakawa | G09G 3/3406 345/102 |
| 2016/0117993 A1* | 4/2016 | Buckley | G09G 3/3413 345/694 |
| 2016/0335957 A1* | 11/2016 | Fu | G09G 3/3426 |
| 2017/0064785 A1 | 3/2017 | Kim et al. | |
| 2018/0373095 A1* | 12/2018 | Yang | G02F 1/133603 |
| 2019/0206335 A1* | 7/2019 | Wu | G09G 3/3426 |
| 2020/0341183 A1* | 10/2020 | Yonemoto | G02B 6/0061 |

FOREIGN PATENT DOCUMENTS

| | | |
|---|---|---|
| CN | 101031171 A | 9/2007 |
| CN | 101435953 A | 5/2009 |
| CN | 101578001 A | 11/2009 |

OTHER PUBLICATIONS

Wei, W. et al., "LED backlight area dynamic control technology analysis," China Academic Journal Electronic Publishing House, Daily Electronic Appliances, vol. 2012, No. 1, Jan. 25, 2012, 5 pages. (Submitted with English Translation).

State Intellectual Property Office of the People's Republic of China, Office Action and Search Report Issued in Application No. 201910166102.3, Apr. 13, 2022, 10 pages. (Submitted with Partial Translation).

* cited by examiner

DISPLAY SYSTEM HAVING ORIGINAL IMAGE BE DISPLAYED WITHOUT COLOR DIFFERENCE

CROSS REFERENCE TO RELATED APPLICATIONS

The present application is a U.S. National Phase of International Application No. PCT/CN2020/076727 entitled "DISPLAY SYSTEM," and filed on Feb. 26, 2020. International Application No. PCT/CN2020/076727 claims priority to Chinese Patent Application No. 201910166102.3 filed on Mar. 6, 2019. The entire contents of each of the above-listed applications are hereby incorporated by reference for all purposes.

TECHNICAL FIELD

The present disclosure relates to the field of display technology and to a display system.

BACKGROUND

At present, both in the flat panel display field and in the projection display field, local dimming technology has become a common technical means to achieve high dynamic range display. A light source array is used as a light source of a display device in local dimming, and each light source is configured for the illumination of a region, so that the luminous intensity of the light source is dynamically controlled during display according to the brightness of each region of a screen to achieve high-contrast display. The conventional local dimming algorithm is first applied in the flat panel display field, and includes a maximum value method, an average value method, and so on. With the development of projection display, the local dimming technology and algorithms have gradually become popular in the field of projection display.

SUMMARY

A technical solution of the present disclosure is to provide a display system. The display system includes a light source system, a display unit, and a dynamic control module. The light source system includes a light source array formed from light source units for emitting light beams, and the light source array can be divided into I×J sub-regions. The display unit is arranged on a light emergent path of the light source system and configured to modulate a light spot on its surface according to a light spot modulation signal to generate image light. The dynamic control module is configured, based on an image signal and dynamically updated information of the light source units including chromaticity information, maximum brightness information, and a correlation curve between a modulation current and a brightness, to obtain the light spot modulation signal and a current modulation signal for modulating the light source system.

The present disclosure has the following beneficial effects. Different from prior art, the present disclosure provides a display system including the light source system, the display unit, and the dynamic modulation module. By calibrating each light source unit in the light source array, the present disclosure can obtain the chromaticity information, the maximum brightness information, the correlation curve of the modulation current and the brightness of the light source unit, and then obtain the current modulation signal and the light spot modulation signal, so as to modulate the light source system and the display unit to obtain an image to be displayed. The present disclosure comprehensively considers the dynamically updated information of the light source unit when acquiring the current modulation signal and the light spot modulation signal, so that the original image can be still displayed without color difference when a light source with different primary color chromaticity coordinates is used.

DETAILED DESCRIPTION

In order to understand the above objectives, features of the present disclosure more clearly, the present disclosure will be described in detail below with reference to the accompanying drawings and specific embodiments. It should be noted that the embodiments of the disclosure and the features in the embodiments can be combined with each other if there is no conflict there between.

In the following description, many specific details are explained in order to fully understand the present disclosure. The embodiments described below are merely some of, rather than all of the embodiments of the present disclosure. Based on the embodiments described in the present disclosure, all other embodiments obtained by those skilled in the art shall fall within the scope of protection of the present disclosure.

Unless otherwise defined, all technical and scientific terms used herein have the same meaning as commonly understood by those skilled in the technical field of the present disclosure. The terms used in the description of the present disclosure herein are only for the purpose of describing specific embodiments which are not intended to limit the present disclosure.

High dynamic display range can be achieved by the local dimming algorithm while unnecessary light energy loss can be avoided, but relative high requirements for the consistency of an emission spectrum of a light source array is necessary for the algorithm. Mokrzycki W S et al. pointed out in "Colour difference ΔE-A survey" that a color difference ΔE 2000 greater than 2 is enough to be noticed by ordinary audiences. In actual situations, a center wavelength of the blue laser will have a large shift due to the factory difference or inconsistency of aging attenuation of the light source. For example, applicant found that the purchased blue laser light source of 455 nm has a center wavelength shifting about 7 nm and the purchased blue laser light source of 465 nm has the center wavelength having the fluctuation range of about 4 nm. When the center wavelength of the blue laser light source is shifted by 3 nm, the color difference ΔE 2000 is 2.4, which indicates that if the conventional local dimming algorithm is used and the color coordinates of the light source colors of different regions are the same, the final displayed image will have a color difference noticed by ordinary audiences.

The present disclosure provides a display system that can solve the problem of color difference of the screen in the field of flat panel display and projection display with the local dimming technology, where the problem is caused by different color coordinates of the display primary colors in different regions due to the factory difference or inconsistency of aging attenuation of the light source.

Figure 1:
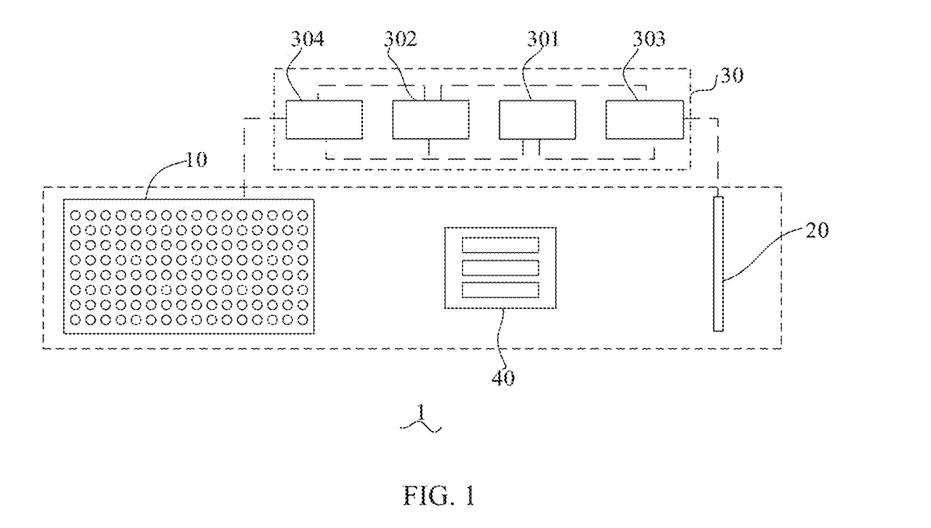
FIG. 1 is a schematic diagram of a display system provided by embodiment 1 of the present disclosure.

FIG. 1 is a schematic diagram of a display system provided by embodiment 1 of the present disclosure. As shown in FIG. 1, a display system 1 of the present disclosure includes a light source system 10 (including a plurality of light source units), a display unit 20, a dynamic control module 30, and a light homogenizing device 40. The dynamic control module 30 includes a color correction part 301, a local dimming part 302, a display modulation part 303, and a light source modulation part 304. The light source 10 emits light beams, and the light beams form a light spot on a surface of the display unit 20 through the light homogenizing device 40. The display unit 20 modulates the light spot on its surface to generate image light. The dynamic control module 30 obtains a light spot modulation signal and a current modulation signal for modulating the light source system 10 according to an image signal as well as a correlation curve between modulation current and brightness of the light source unit, chromaticity information, and maximum brightness information that are dynamically updated.

Specifically, the light source system 10 includes a light source array, which is formed from a plurality of light source units and configured to emit light beams, the light source array can be divided into I×J sub-regions. Each sub-region of the light source array is configured for a primary illumination of an image partition of the image to be displayed, and the image partition includes a plurality of pixels. In this embodiment, the light source array is one of a laser light source array and a light emitting diode array, and the light source unit is a single laser light source or a single light emitting diode in the light source array.

The light source system 10 emits light beams, the light beams form the light spot on the surface of the display unit 20 through light homogenizing device 40, and the display unit 20 modulates the light spot on the surface to form image light. In this embodiment, the display unit 20 is a spatial light modulator. Specifically, the display unit can be a digital micromirror device (DMD), a reflective liquid crystal on silicon (LCoS), or a liquid crystal display (LCD). The display unit includes dimming regions corresponding to the image partitions in one-to-one correspondence.

The dynamic control module 30 is configured to obtain a light spot modulation signal and a current modulation signal for modulating the light source system 10 according to an image signal as well as a correlation curve between a modulation current and a brightness of the light source unit, chromaticity information, and maximum brightness information that are dynamically updated.

Specifically, the dynamic control module 30 includes a color correction part 301, a local dimming part 302, a display modulation part 303, and a light source modulation part 304. The color correction part 301 is configured to obtain a light source correction signal through a white balance correction according to the maximum brightness information and the chromaticity information of each light source unit.

The light source correction signal includes chromaticity information and brightness correction information of each light source unit. The chromaticity information of the light source unit includes chromaticity coordinates (x, y) of light source unit of each color, the maximum brightness information includes the maximum brightness value that the light source unit of each color can display, and the brightness correction information includes the corrected brightness value of each of light source unit groups, i.e., the brightness value when the maximum brightness white point is achieved. Each of light source unit groups includes light source units of multiple colors and is a minimum unit that can achieve a white point spatially. For example, when the light source system includes only laser light sources, each of light source unit groups can includes a red laser light source unit, a green laser light source unit, and a blue laser light source unit that are adjacent to each other and can achieve the white point through a light combining device or other ways. It should be understood that the sub-region of the light source array includes one or more light source unit groups. The examples are only for convenience of explanation, and the present disclosure does not limit the combination of light source unit groups. A light source unit group can also include a blue laser light source unit, a red excited-light light source and a green excited-light light source, and the red excited-light light source and the green excited-light light source are obtained through exciting a wavelength conversion region by this blue laser light source unit. Moreover, the number of light source units in the light source unit group can not necessarily be R:G:B=1:1:1, and can also be other numbers, such as R:G:B=1:2:1.

Figure 2:
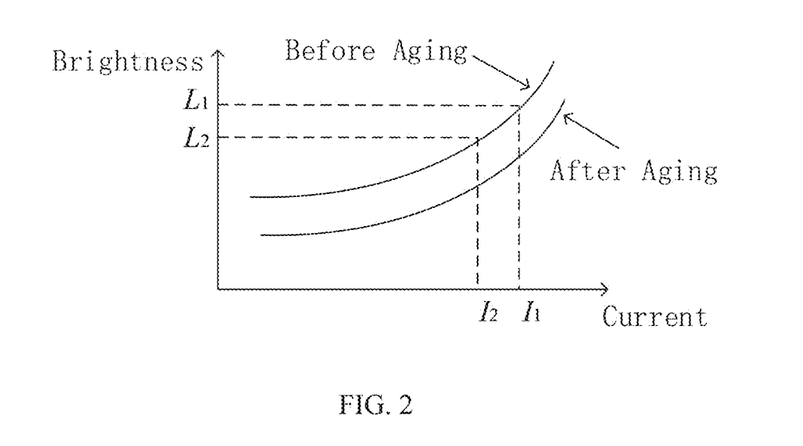
FIG. 2 shows correlation curves between a modulation current and a brightness of a light source unit before aging and after aging according to the present disclosure.

The chromaticity information of the light source unit and the maximum brightness information of the light source unit are obtained by calibrating the light source unit. In the display with local dimming, the light source units in different sub-regions have different aging degrees and factory differences, which can cause different center wavelengths of the light source units. Therefore, the light source unit needs to be calibrated before the calculation of the color correction unit 301. The calibration can be performed when the light source unit leaves the factory, or periodically during use, or obtained in real time, so as to consider the color deviation caused by the difference in the center wavelength of the light source unit during calibration. During calibration, it is also necessary to measure the correlation between the brightness and current of the light source unit to obtain the correlation curve between the modulation current and the brightness of the light source system. Due to the aging effect of the light source, the correlation between the brightness and the current of the light source unit may change. Generally speaking, after the light source unit is aging, if the same current is applied to the light source unit, the brightness will not reach the brightness that can be achieved before the aging. In other words, to achieve the same brightness as before the aging, it needs to apply a larger current to the aged light source unit. In addition, the maximum brightness information of the light source unit after aging will change, that is, the maximum brightness information of the light source unit after aging will change, resulting in a change in the finally calculated light source correction signal. FIG. 2 shows the correlation between the modulation current and the brightness of the light source unit before aging and the correlation between the modulation current and the brightness of the light source unit after aging. During calibration, each light source unit should be calibrated separately, that is, when a light source unit is calibrated, other light source units should be turned off to eliminate the influence caused by other light source units.

For example, if the chromaticity coordinates $(x_r, y_r)$ of the red light source unit are (16/25, 1/3), the maximum displayable brightness value of the red light source unit $Y_{rmax}=6$; the chromaticity coordinates of the green light source unit $(x_g, y_g)$ is (3/10, 3/5), the maximum displayable brightness value of the green light source unit $Y_{gmax}=8$: the chromaticity coordinates $(x_b, y_b)$ of the blue light source unit is (3/20, 3/50), the maximum displayable brightness value $Y_{bmax}=7$ of the blue light source unit. The display color gamut of the display system 10 is the standard DCI-P3 color gamut. In the DCI-P3 color gamut, the coordinates of the white point are (0.3127, 0.3290). Assuming that the maximum brightness of the white point is $Y_w$, when reaching the white point with the maximum brightness, the brightness value of the red light source unit is $Y_r$, the brightness value of the green light source unit is $Y_g$, and the brightness value of the blue light source unit is $Y_g$. The CIE-xyY color space can be converted to CIE-XYZ color space through the following conversion relationship:

$$\begin{cases} X = \dfrac{x}{y} \cdot Y \\ Y = Y \\ Z = \dfrac{1-x-y}{y} \cdot Y \end{cases} \quad (1)$$

With the coordinate conversion of formula (1), it can be obtained that tristimulus values $(X_r, Y_r, Z_r)$ of the red light source unit are $(1.92Y_r, Y_r, 0.08Y_r)$, tristimulus values $(X_g, Y_g, Z_g)$ of the green light source unit are $(0.50Y_g, Y_g, 0.17Y_g)$, tristimulus values of the blue light source unit $(X_b, Y_b, Z_b)$ are $(2.50Y_b, Y_b, 13.17Y_b)$, tristimulus values of the white point light source unit $(X_w, Y_w, Z_w)$ are $(0.89Y_w, Y_w, 0.95Y_w)$. Since the tristimulus values of the white point is the sum of the tristimulus values of the red, green, and blue light source units, it can be obtained that:

$$\begin{cases} 0.89Y_w = 1.92Y_r + 0.50Y_g + 2.50Y_b \\ Y_w = Y_r + Y_g + Y_b \\ 0.95Y_w = 0.08Y_r + 0.17Y_g + 13.17Y_b \end{cases} \quad (2)$$

The expressions of $Y_r$, $Y_g$, $Y_b$ with respect to $Y_w$ can be obtained by formula (2), and the maximum brightness values displayed by the red, green, and blue light source units are used as limits, and it can be obtained that:

$$\begin{cases} Y_r = 0.19Y_w \le Y_{rmax} \\ Y_g = 0.75Y_w \le Y_{gmax} \\ Y_b = 0.06Y_w \le Y_{bmax} \end{cases} \quad (3)$$

By calculating with formulas in formula (3), $Y_w \le 10.7$. Assuming $Y_w=10$, then $Y_r=1.9$, $Y_g=7.5$, $Y_b=0.6$, $Y_r$ $Y_g$, $Y_b$ are the brightness correction information in the light source correction signal. This step is also called white balance calibration. The light source correction signal includes the chromaticity information of the light source unit and the brightness correction information of the light source unit, that is, the chromaticity information of the light source unit includes the chromaticity coordinates $(x_r, y_r)$ of the red light source unit and the chromaticity coordinates of the green light source unit $(x_g, y_g)$, the chromaticity coordinates $(x_b, y_b)$ of the blue light source unit; and the brightness correction information includes the corrected brightness value $Y_r$ of the red light source unit, the corrected brightness value $Y_g$ of the green light source unit, and the corrected brightness value $Y_b$ of the blue light source unit.

The examples are only for convenience of illustration, and the present disclosure does not limit the color of the light source unit, the chromaticity coordinates of the light source unit, the maximum brightness value that the light source unit can display, the white point coordinates, and the like.

The local dimming part 302 is configured to obtain the local dimming signal of the light source system according to the image signal and the light source correction signal. Specifically, the calculation needs the brightness correction information of the light source unit in the light source correction signal, i.e., including $Y_r$, $Y_g$, $Y_b$ that are calculated by the color correction part. The calculated local dimming signal includes the local dimming value of each light source unit, that is, a ratio of the modulated brightness value of the light source unit to the corrected brightness value of the light source unit.

Figure 3:
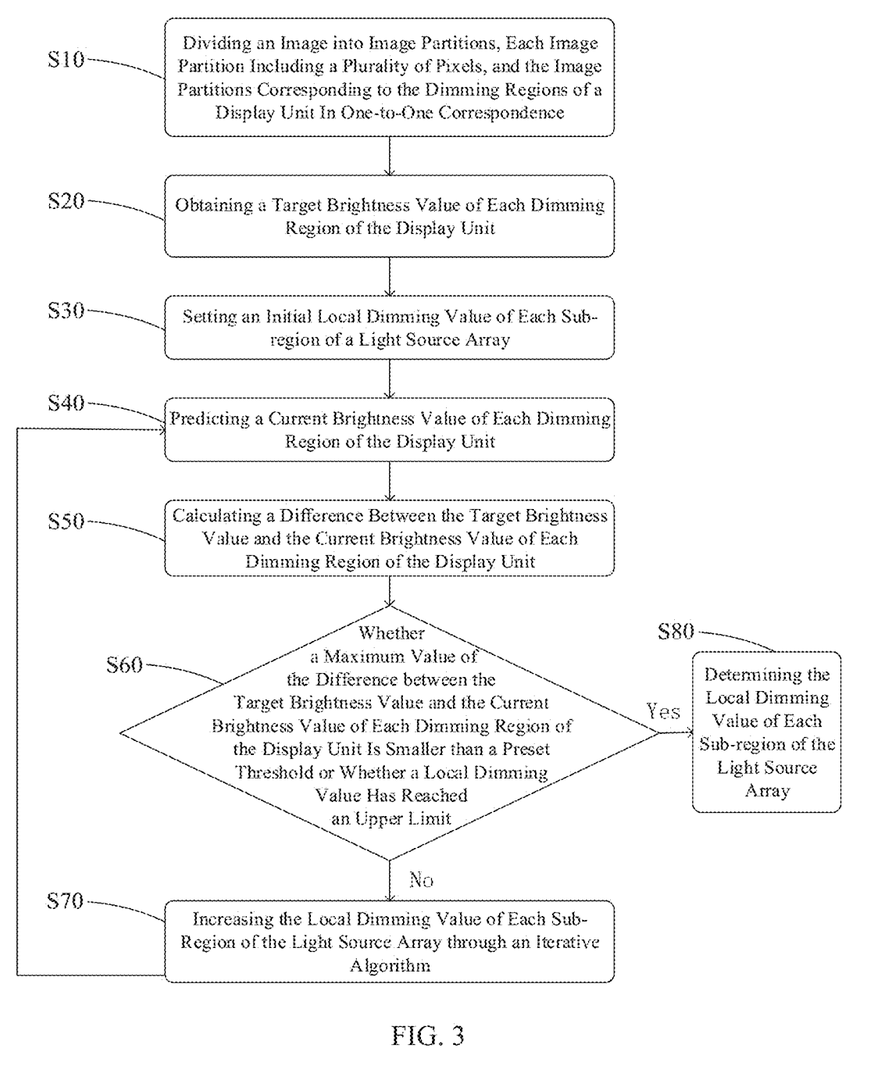
FIG. 3 is a flowchart of calculating a local dimming signal by a local dimming part according to the embodiment 1 of the present disclosure.

FIG. 3 is a flowchart of calculating the local dimming signal by the local dimming part 302 according to the embodiment 1 of the present disclosure and includes the steps S10 to S80.

S10: an image is divided into image partitions, each image partition includes a plurality of pixels, and the image partitions correspond to the dimming regions of the display unit in one-to-one correspondence.

S20: a target brightness value of each dimming region of the display unit is obtained. In this embodiment, the maximum brightness of each image partition is taken as the target brightness value of each dimming region of the display unit.

S30: an initial local dimming value of each sub-region of the light source array is set. Specifically, in this embodiment, the initial local dimming value of each sub-region of the light source array is set to 0.

S40: a current brightness value of each dimming region of the display unit is predicted. According to a point spread function of each light source unit and the local dimming value of each sub-region of the light source array, the current brightness value of each dimming region of the display unit can be predicted.

S50: a difference between the target brightness value and the current brightness value of each dimming region of the display unit is calculated.

S60: whether a maximum value of the difference between the target brightness value and the current brightness value of each dimming region of the display unit is smaller than a preset threshold or whether the local dimming value has reached an upper limit is determined. The preset threshold value can be adjusted as needed. If it only needs to satisfy that the target brightness value of each dimming region of the display unit is greater than or equal to the current brightness value of each dimming region of the display unit, the preset threshold value can be set to 0. If the determining result of step S60 is no, then proceed to step S70; and if the determining result of step S60 is yes, then proceed to step S80.

S70: the local dimming value of each sub-region of the light source array is increased through an iterative algorithm. A step value of the local dimming value can also be adjusted as needed. The smaller the step value, the finer the adjustment, but the number of iterations will increase accordingly. Conversely, the larger the step value, the smaller the number of calculations. For example, that the step value is set to 0.01 indicates that in each iteration, the brightness of the light source unit in the sub-region of the light source array is increased by 0.01 times the corrected brightness value of the light source unit.

S80: the local dimming value of each sub-region of the light source array is determined.

The display modulation part 303 is configured to obtain the light spot modulation signal according to the image signal, the light source correction signal and the local dimming signal. The light spot modulation signal contains the modulation amount of the display unit to each color light spot.

For example, if the light source array includes a red light source unit, a green light source unit, and a blue light source unit, under a condition that the image signal, the light source correction signal and the local dimming signal are determined, the modulation amount $r_m$, $g_m$, $b_m$ of the red, green, and blue light spots modulated by the display unit can be calculated by formula (4):

$$\begin{bmatrix} r_m \\ g_m \\ b_m \end{bmatrix} = \begin{bmatrix} \sum_{k=1}^{n} \frac{x_{rk}}{y_{rk}} D_{rk} & \sum_{k=1}^{n} \frac{x_{gk}}{y_{gk}} D_{gk} & \sum_{k=1}^{n} \frac{x_{bk}}{y_{bk}} D_{bk} \\ \sum_{k=1}^{n} Y_{rk} D_{rk} & \sum_{k=1}^{n} Y_{gk} D_{gk} & \sum_{k=1}^{n} Y_{bk} D_{bk} \\ \sum_{k=1}^{n} \frac{1-x_{rk}-y_{rk}}{y_{rk}} D_{rk} & \sum_{k=1}^{n} \frac{1-x_{rk}-y_{rk}}{y_{rk}} D_{gk} & \sum_{k=1}^{n} \frac{1-x_{rk}-y_{rk}}{y_{rk}} D_{bk} \end{bmatrix}^{-1} \begin{bmatrix} X_p \\ Y_p \\ Z_p \end{bmatrix} \quad (4)$$

With reference to the coordinate change of formula (1), formula (4) can be expressed as:

$$\begin{bmatrix} r_m \\ g_m \\ b_m \end{bmatrix} = \begin{bmatrix} \sum_{k=1}^{n} X_{rk} D_{rk} & \sum_{k=1}^{n} X_{gk} D_{gk} & \sum_{k=1}^{n} X_{bk} D_{bk} \\ \sum_{k=1}^{n} Y_{rk} D_{rk} & \sum_{k=1}^{n} Y_{gk} D_{gk} & \sum_{k=1}^{n} Y_{bk} D_{bk} \\ \sum_{k=1}^{n} Z_{rk} D_{rk} & \sum_{k=1}^{n} Z_{gk} D_{gk} & \sum_{k=1}^{n} Z_{bk} D_{bk} \end{bmatrix}^{-1} \begin{bmatrix} X_p \\ Y_p \\ Z_p \end{bmatrix}, \quad (5)$$

where the color conversion matrix in formula (5) is $$CSC = \begin{bmatrix} \sum_{k=1}^{n} X_{rk} D_{rk} & \sum_{k=1}^{n} X_{gk} D_{gk} & \sum_{k=1}^{n} X_{bk} D_{bk} \\ \sum_{k=1}^{n} Y_{rk} D_{rk} & \sum_{k=1}^{n} Y_{gk} D_{gk} & \sum_{k=1}^{n} Y_{bk} D_{bk} \\ \sum_{k=1}^{n} Z_{rk} D_{rk} & \sum_{k=1}^{n} Z_{gk} D_{gk} & \sum_{k=1}^{n} Z_{bk} D_{bk} \end{bmatrix}^{-1},$$

the color conversion matrix CSC can be divided into two parts, one part is the light source characteristic matrix $C_k=$ $$C_k = \begin{bmatrix} X_{rk} & X_{gk} & X_{bk} \\ Y_{rk} & Y_{gk} & Y_{bk} \\ Z_{rk} & Z_{gk} & Z_{bk} \end{bmatrix}$$

obtained by performing the coordinate conversion on the chromaticity information and the brightness correction information of the light source unit in the light source correction signal by using formula (1), and the other part is a local dimming matrix $D_k=$ $$D_k = \begin{bmatrix} D_{rk} & 0 & 0 \\ 0 & D_{gk} & 0 \\ 0 & 0 & D_{bk} \end{bmatrix}$$

obtained through the local dimming signal outputted by the local dimming part 302. In formula (5), $X_p$, $Y_p$, $Z_p$ are the tristimulus values of each pixel, which can be obtained by converting the RGB values of each pixel inputted to the system in the case that the display color gamut of the display system is a known value. In addition, k in the formula represents that the k-th light source unit that contributes to the pixel.

The light source modulation part 304 is configured to obtain the current modulation signal of the light source system based on the local dimming signal, the light source correction signal and the correlation curve between the modulation current and the brightness of each of the light source units.

FIG. 2 shows correlation curves between a modulation current and a brightness of a light source unit before aging and after aging according to the present disclosure. For example, assuming $L_1$ denotes the corrected brightness of the red light source unit, and the local dimming value of a certain red light source unit is 0.7, $L_2=0.7L_1$. In the correlation curves between the modulation current and the brightness of the light source unit after aging, the current value $I_2$ corresponding to $L_2$ is searched, that is, the current value $I_2$ needs to be output to the red light source unit to adjust the brightness of the light source unit.

By calibrating each light source unit in the light source array, the present disclosure can obtain the chromaticity information, the maximum brightness information, the correlation curve of the modulation current and the brightness of the light source unit, and then obtain the current modulation signal and the light spot modulation signal, and modulate the light source system and the display unit to obtain the image to be displayed. The present disclosure comprehensively considers the dynamically updated information of the light source unit when acquiring the current modulation signal and the light spot modulation signal, so that the original image can still be displayed without color difference when a light source with different primary color chromaticity coordinates is used.

Embodiment 1 is mainly applied in the projection display field, but in the flat panel display field, the local dimming technology is also applicable. Therefore, in a first variation embodiment of the embodiment 1 of the present disclosure, the light source array is one of an electroluminescent sheet array, a cold cathode fluorescent lamp array and a light emitting diode array, and the display unit is a liquid crystal panel.

Embodiment 1 can realize display without color difference. However, in the display technology with local dimming, the aging degree of each light source unit is different, so after the white balance calibration performed by the color correction part, the correction brightness of the white point obtained by superposing each light source unit group is inconsistent, and thus it may cause the brightness of each part of the image to be inconsistent when displaying a full white field. For example, assuming a light source unit group includes a red light source unit, a green light source unit, and a blue light source unit. After the white balance calibration performed by the color correction part, the corrected brightness of one light source unit group includes $Y_{r1}=1.9$, $Y_{g1}=7.5$, $Y_{b1}=0.6$, and $Y_{w1}=Y_{r1}+Y_{g1}+Y_{b1}=10$: the corrected brightness of another light source unit group includes $Y_{r2}=1.3$, $Y_{g2}=6.9$, $Y_{b2}=0.8$, and $Y_{w2}=Y_{r2}+Y_{g2}+Y_{b2}=9$. Since $Y_{w1} \neq Y_{w2}$, it is necessary to adjust the corrected brightness of the light source unit. In a second variation embodiment of the first embodiment of the present disclosure, the color correction part 301 can also balance the maximum brightness white point that can be achieved by each group, and the color correction part 301 detects the minimum value of the summed white point correction brightness of each of light source unit groups, and reduces other groups of light source units to this minimum value of the white point brightness.

For example, assuming that $Y_{w2}=9$ in the light source array is the minimum white point brightness, $Y_{w1}$ should be reduced to 9. When performing adjustment, $Y_{r1}$ is adjusted to $$Y'_{r1} = Y_{r1} \times \frac{Y_{W_2}}{Y_{W_1}} = 1.7, \ Y'_{g1} = Y_{g1} \times \frac{Y_{W_2}}{Y_{W_1}} = 6.7, \text{ and } Y'_{b1} = Y_{b1} \times \frac{Y_{W_2}}{Y_{W_1}} = 0.6.$$

That is, the corrected brightness of the red light source unit, the corrected brightness of the green light source unit, and the corrected brightness of the blue light source unit are reduced according to the ratio of the brightness of the white point, so that when the ratio of the corrected brightness of each red light source unit, the ratio of the corrected brightness of the green light source unit, and the ratio of the corrected brightness of the blue light source unit remain unchanged, the corrected brightness of the white points after the superposition of light source array is the same. In this way, the final display screen brightness balance can be achieved.

In addition, since the target brightness value of each dimming region of the display unit the local dimming part 302 of embodiment 1 is directly determined by the input image and the color gamut of the display system, without taking the color gamut range of the light source unit into account, thus the maximum brightness value of the image partition obtained by the local dimming part 302 may be too small, that is, the target brightness value of each dimming region of the display unit is too small, and the local dimming value in the finally calculated local dimming signal is too small, and therefore the light spot modulation amount in the light spot modulation signal calculated by the display modulation part 303 can be greater than 1, i.e., exceeding the modulation range of the display unit.

Therefore, in a third variation embodiment of the embodiment 1, in order to obtain the target brightness value of each dimming region of the display unit, the brightness modulation signal of each color is calculated according to the image signal and the color gamut combined by light source units of respective colors within the corresponding sub-region, the maximum value of the brightness modulation signal of each color is taken as the target brightness value of each dimming region of the display unit, and the local dimming signal of the light source system is obtained again according to the light source correction signal. During the calculation, the light source units of respective colors within the corresponding sub-region are a light source unit emitting light with a maximum wavelength and a light source unit emitting light with a minimum wavelength in the sub-region.

For example, assuming that each image partition contains 4 pixels, the corresponding sub-region of the light source array of each image partition includes 4 light source unit groups, and each light source unit group includes a red light source unit, a green light source unit, and a blue light source unit. The image signal includes the tristimulus values of 4 pixels in the image partition, which are $X_1$, $Y_1$, $Z_1$; $X_2$, $Y_2$, $Z_2$; $X_3$, $Y_3$, $Z_3$; $X_4$, $Y_4$, $Z_4$. In the sub-region of the light source array, the wavelengths of red light source units $R_1$-$R_4$ are $\lambda_{r1}$, $\lambda_{r2}$, $\lambda_{r3}$, $\lambda_{r4}$: the wavelengths of green light source units $G_1$-$G_4$ are $\lambda_{g1}$, $\lambda_{g2}$, $\lambda_{g3}$, $\lambda_{g4}$; and the wavelengths of blue light source units $B_1$-$B_4$ are $\lambda_{b1}$, $\lambda_{b2}$, $\lambda_{b3}$, $\lambda_{b4}$.

The maximum wavelength and minimum wavelength of the light source unit of each color are obtained respectively. Assuming $\lambda_{r2}=\max(\lambda_{r1}, \lambda_{r2}, \lambda_{r3}, \lambda_{r4})$, $\lambda_{r4}=\min(\lambda_{r1}, \lambda_{r2}, \lambda_{r3}, \lambda_{r4})$, $\lambda_{g1}=\max(\lambda_{g1}, \lambda_{g2}, \lambda_{g3}, \lambda_{g4})$, $\lambda_{g3}=\min(\lambda_{g1}, \lambda_{g2}, \lambda_{g3}, \lambda_{g4})$, $\lambda_{b3}=\max(\lambda_{b1}, \lambda_{b2}, \lambda_{b3}, \lambda_{b4})$, and $\lambda_{b1}=\min(\lambda_{b1}, \lambda_{b2}, \lambda_{b3}, \lambda_{b4})$. Therefore, 6 light source units can form 8 different color gamuts, named color gamut groups 1 to 8, which are respectively $(R_2, G_1, B_1)$, $(R_2, G_1, B_3)$, $(R_2, G_3, B_1)$, $(R_2, G_3, B_3)$, $(R_4, G_1, B_1)$, $(R_4, G_1, B_3)$, $(R_4, G_3, B_1)$, and $(R_4, G_3, B_3)$.

The target brightness value of each dimming region of the display unit is obtained by the following calculation. For the first pixel and color gamut group 1, the calculation step for calculating the brightness modulation signals $r_{11}$, $g_{11}$, and $b_{11}$ of each color is as follows:

$$\begin{bmatrix} r_{11} \\ g_{11} \\ b_{11} \end{bmatrix} = \begin{bmatrix} \frac{x_{r2}}{y_{r2}} Y_{r2} & \frac{x_{g1}}{y_{g1}} Y_{g1} & \frac{x_{b1}}{y_{b1}} Y_{b1} \\ Y_{r2} & Y_{g1} & Y_{b1} \\ \frac{1 - x_{r2} - y_{r2}}{y_{r2}} Y_{r2} & \frac{1 - x_{g1} - y_{g1}}{y_{g1}} Y_{g1} & \frac{1 - x_{b1} - y_{b1}}{y_{b1}} Y_{b1} \end{bmatrix}^{-1} \begin{bmatrix} X_1 \\ Y_1 \\ Z_1 \end{bmatrix}. \quad (6)$$

In formula (6), $(x_{r2}, y_{r2})$ are the chromaticity coordinates of the red light source unit $R_2$, $(x_{g1}, y_{g1})$ are the chromaticity coordinates of the green light source unit $G_1$, and $(x_{b1}, y_{b1})$ are the chromaticity coordinates of the blue light source unit $B_1$; $Y_{r2}$, $Y_{g1}$, and $Y_{b1}$ are the corrected brightness value of the red light source unit $R_2$, the corrected brightness value of the green light source unit $G_1$, and the corrected brightness value of the blue light source unit $B_1$, respectively. The above values can be obtained from the light source correction signal.

Similarly, $r_{12}$, $g_{12}$, and $b_{12}$ can be obtained with the first pixel and color gamut group 2 with reference to formula (6). In the similar way, $r_{mn}$ (m=1~4, n=1~8), $g_{mn}$ (m=1~4, n=1~8), and $b_{mn}$ (m=1~4, n=1~8) can be obtained respectively, and finally $\max[r_{mn}$ (m=1~4, n=1~8)], $\max[g_{mn}$ (m=1~4, n=1~8)], and $\max[b_{mn}$ (m=1~4, n=1~8)] are taken as the target brightness values of each dimming region of the display unit.

By comprehensively considering the signal of the image partition and the color gamut of the corresponding sub-region of the light source array, after local dimming is performed on the light source system, the brightness of the light spot formed on the surface of the dimming region of the display unit is greater than the maximum brightness of the image partition corresponding to the dimming region, and thus the calculated modulation amount of the display unit is not greater than its modulation range.

Embodiment 1 can realize the restoration of the image to be displayed without color difference, but the calculation amount is large and a lot of computing resources are required. Embodiment 2 can make use of certain characteristics of fluorescence in the field of projection display to simplify the calculation.

Figure 4:
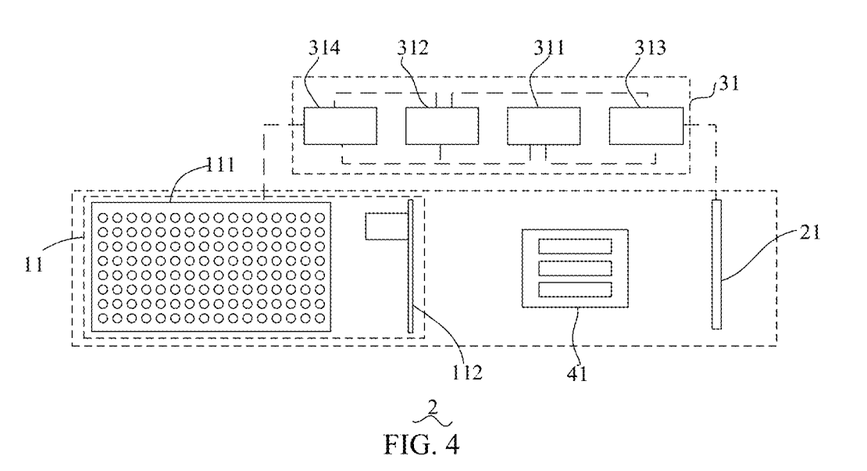
FIG. 4 is a schematic diagram of a display system according to embodiment 2 of the present disclosure.

FIG. 4 is a schematic diagram of a display system according to embodiment 2 of the present disclosure. As shown in FIG. 2, a display system 2 of the present disclosure includes a light source system 11, a display unit 21, a dynamic control module 31, and a light homogenizing device 41. The light source system 11 includes a light source array 111 and a wavelength conversion device 112. The dynamic control module 31 includes a color correction part 311, a local dimming part 312, a display modulation part 313, and a light source modulation part 314. The only system structure difference between the embodiment 2 and the embodiment 1 is that the light source system 11 of the embodiment 2 further includes the wavelength conversion device 112. The wavelength conversion device 112 includes a wavelength conversion region and a scattering region of the light source array. The wavelength conversion region is coated with phosphor, and the phosphor absorbs at least part of the light emitted from the light source array and emits excited light. Generally, the light field obtained by the phosphor is uniform, and the human eye is not sensitive to the chromatic aberration of the light field generated by the phosphor. Therefore, the chromaticity coordinate value of the light source unit of the excited light can be a certain fixed value taken within its chromaticity range, and the chromaticity coordinate value of the light source unit is included in its chromaticity information.

For example, assuming that the light source array 111 is a blue laser light source array, the wavelength conversion region of the wavelength conversion device 112 is uniformly coated with red phosphor and green phosphor, and the wavelength conversion device 112 also includes a scattering region for the blue laser light source. The blue laser light source excites the red phosphor and the green phosphor to generate a uniform red fluorescence light field and a uniform green fluorescence light field, respectively. The blue laser light source passes through the scattering region of the wavelength conversion device 112 and has a certain diffusion. Since the red fluorescence light field and the green fluorescence light field are uniform light fields, the chromaticity value of the red light source unit in the chromaticity information of the red light source unit can be a fixed value within its chromaticity range. Similarly, the chromaticity value of the green light source unit in the chromaticity information of the green light source unit can be a fixed value within its chromaticity range, that is, $(x_r, y_r)$ and $(x_g, y_g)$ are fixed constants. Through formula (4) and characteristics of $(x_r, y_r)$, $(x_g, y_g)$ that are fixed constants, the color conversion matrix CSC is as follows:

$$CSC = \begin{bmatrix} \frac{x_r}{y_r}\sum_{k=1}^{n} D_{rk} & \frac{x_g}{y_g}\sum_{k=1}^{n} D_{gk} & \sum_{k=1}^{n} X_{bk}D_{bk} \\ \sum_{k=1}^{n} Y_{rk}D_{rk} & \sum_{k=1}^{n} Y_{gk}D_{gk} & \sum_{k=1}^{n} Y_{bk}D_{bk} \\ \frac{1-x_r-y_r}{y_r}\sum_{k=1}^{n} D_{rk} & \frac{1-x_g-y_g}{y_g}\sum_{k=1}^{n} D_{gk} & \sum_{k=1}^{n} Z_{bk}D_{bk} \end{bmatrix}^{-1} \quad (7)$$

In this case, the color conversion matrix can be expressed as $$\frac{C^*}{|C|} = \frac{1}{|C|}\begin{bmatrix} C_{11}^* & C_{12}^* & C_{13}^* \\ C_{21}^* & C_{22}^* & C_{23}^* \\ C_{31}^* & C_{32}^* & C_{33}^* \end{bmatrix},$$

where $C^*$ is the adjoint matrix a, $|C|$ and is the matrix determinant.

$$|C| = \sum_{k=1}^{n} Y_{rk}D_{rk} \sum_{k=1}^{n} Y_{gk}D_{gk}\left[\left(\frac{1-x_g-y_g}{y_g} - \frac{1-x_r-y_r}{y_r}\right)\sum_{k=1}^{n} X_{bk}D_{bk} + \left(\frac{x_g}{y_g}\frac{1-x_r-y_r}{y_r} - \frac{x_r}{y_r}\frac{1-x_g-y_g}{y_g}\right)\sum_{k=1}^{n} Y_{bk}D_{bk} + \left(\frac{x_r}{y_r} - \frac{x_g}{y_g}\right)\sum_{k=1}^{n} Z_{bk}D_{bk}\right]$$

$$C_{11}^* = (-1)^{1+1}\begin{vmatrix} \sum_{k=1}^{n} Y_{gk}D_{gk} & \sum_{k=1}^{n} Y_{bk}D_{bk} \\ \frac{1-x_g-y_g}{y_g}\sum_{k=1}^{n} Y_{gk}D_{gk} & \sum_{k=1}^{n} Z_{bk}D_{bk} \end{vmatrix} =$$

$$\sum_{k=1}^{n} Y_{gk}D_{gk}\left(\sum_{k=1}^{n} Z_{bk}D_{bk} - \frac{1-x_g-y_g}{y_g}\sum_{k=1}^{n} Y_{bk}D_{bk}\right)$$

$$C_{12}^* = (-1)^{1+2}\begin{vmatrix} \sum_{k=1}^{n} Y_{rk}D_{rk} & \sum_{k=1}^{n} Y_{bk}D_{bk} \\ \frac{1-x_r-y_r}{y_r}\sum_{k=1}^{n} Y_{rk}D_{rk} & \sum_{k=1}^{n} Z_{bk}D_{bk} \end{vmatrix} =$$

$$\sum_{k=1}^{n} Y_{rk}D_{rk}\left(\frac{1-x_r-y_r}{y_r}\sum_{k=1}^{n} Y_{bk}D_{bk} - \sum_{k=1}^{n} Z_{bk}D_{bk}\right)$$

$$C_{13}^* = (-1)^{1+3}\begin{vmatrix} \sum_{k=1}^{n} Y_{rk}D_{rk} & \sum_{k=1}^{n} Y_{gk}D_{gk} \\ \frac{1-x_r-y_r}{y_r}\sum_{k=1}^{n} Y_{rk}D_{rk} & \frac{1-x_g-y_g}{y_g}\sum_{k=1}^{n} Y_{gk}D_{gk} \end{vmatrix} =$$

$$\sum_{k=1}^{n} Y_{rk}D_{rk}\sum_{k=1}^{n} Y_{gk}D_{gk}\left(\frac{1-x_g-y_g}{y_g} - \frac{1-x_r-y_r}{y_r}\right)$$

For each pixel, it just needs to calculate the five sums, i.e., $\sum_{k=1}^{n} Y_{rk}D_{rk}$, $\sum_{k=1}^{n} Y_{gk}D_{gk}$, $\sum_{k=1}^{n} X_{bk}D_{bk}$, $\sum_{k=1}^{n} Y_{bk}D_{bk}$, and $\sum_{k=1}^{n} Z_{bk}D_{bk}$; and then they are multiplied and added with fixed parameters, such as fixed values related to fluorescent materials $$\left(\frac{1-x_g-y_g}{y_g} - \frac{1-x_r-y_r}{y_r}\right), \left(\frac{x_g}{y_g}\frac{1-x_r-y_r}{y_r} - \frac{x_r}{y_r}\frac{1-x_g-y_g}{y_g}\right),$$

$$\left(\frac{x_r}{y_r} - \frac{x_g}{y_g}\right), \frac{1-x_g-y_g}{y_g}, \frac{1-x_r-y_r}{y_r}, \text{and } \left(\frac{1-x_g-y_g}{y_g} - \frac{1-x_r-y_r}{y_r}\right),$$

and the like. Because FPGA is good at multiplying and adding, but not good at dividing operations, after adopting this simplification, for each pixel, only need to calculate one division operation $$\frac{1}{|C|},$$

effectively improving the FPGA computing speed.

Embodiment 2 can achieve simplified calculation by taking a fixed value for the chromaticity coordinate value of the excited-light light source unit. However, since the chromaticity coordinate of the light source unit of the light source array cannot be approximated by a fixed value, the calculation amount is still relatively large. In a first variation embodiment of the embodiment 2 of the present disclosure, the light source units in the light source array are randomly arranged. Since the light source units of different wavelengths are superimposed after being randomly arranged, the chromaticity coordinate value of the light source unit of the light source array can be a certain fixed value taken within its chromaticity range, the calculation is further simplified, and the color difference of the displayed image is within the acceptable range of the human eye. The chromaticity coordinate value of the light source array is within the chromaticity range, and is usually calculated by taking the chromaticity coordinate of the laser light source whose center wavelength is the middle value of the fluctuation range. It should be understood that the chromaticity coordinate value of the light source unit is included in its chromaticity information.

For example, for a blue laser light source with a center wavelength fluctuation range of 463 nm to 467 nm, the chromaticity coordinates of the blue laser light source with the center wavelength of 465 nm are used for calculation. At the same time, it is assumed that both the red fluorescence light field and the green fluorescence light field are obtained though exciting the phosphor by the blue laser light source with the center wavelength of 465 nm, so the chromaticity coordinates of the red fluorescence light field and the green fluorescence light field are also determined. At this time, $Y_{rk}$, $Y_{gk}$, and $Y_{bk}$ can be obtained by white balance calculation, so the values in the matrix $C_k$ are all determined. Therefore, each value in the light source characteristic matrix $C_k$ is a fixed value. At this time, the light source characteristic matrix $C_k$ can be expressed as a certain matrix $C_0$.

$$C_0 = \begin{bmatrix} X_{r0} & X_{g0} & X_{b0} \\ Y_{r0} & Y_{g0} & Y_{b0} \\ Z_{r0} & Z_{g0} & Z_{b0} \end{bmatrix}, \text{ and}$$

$$CSC = \left(\sum_{k=1}^{n} C_k \begin{bmatrix} D_{rk0} & 0 & 0 \\ 0 & D_{gk} & 0 \\ 0 & 0 & D_{bk} \end{bmatrix}\right)^{-1} = \left(C_0 \sum_{k=1}^{n} \begin{bmatrix} D_{rk} & 0 & 0 \\ 0 & D_{gk} & 0 \\ 0 & 0 & D_{bk} \end{bmatrix}\right)^{-1} = \begin{bmatrix} \frac{1}{\sum_{k=1}^{n} D_{rk}} & 0 & 0 \\ 0 & \frac{1}{\sum_{k=1}^{n} D_{gk}} & 0 \\ 0 & 0 & \frac{1}{\sum_{k=1}^{n} D_{bk}} \end{bmatrix} C_0^{-1}.$$

Figure 5A:
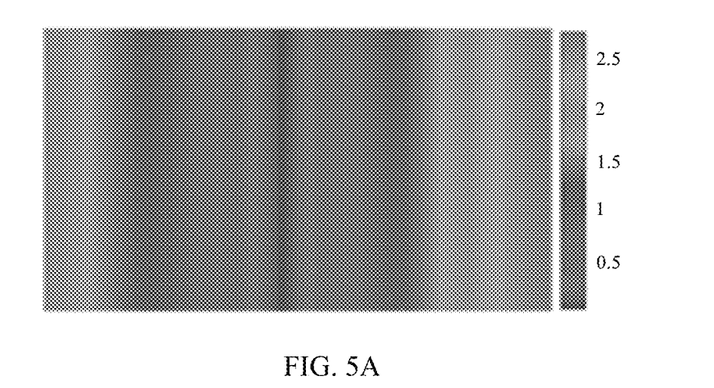
FIGS. 5A and 5B are diagrams showing color differences of the displayed image when the light source units are arranged regularly and when the light source units are arranged randomly.
Figure 5B:
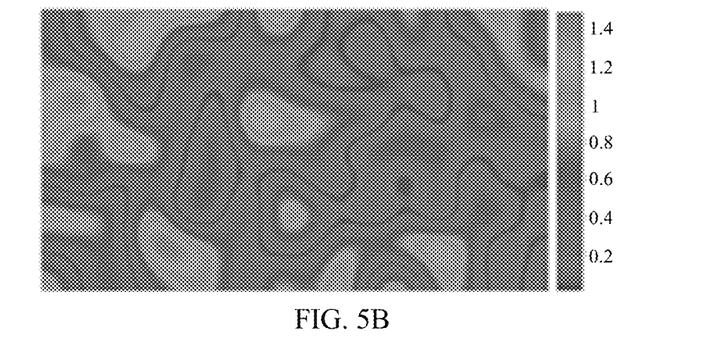

FIGS. 5A and 5B are diagrams showing color differences of the displayed image when the light source units are arranged regularly and when the light source units are arranged randomly. FIG. 5A is a diagram showing the color difference of the final displayed image when the above simplified calculation is used and the blue laser light sources with the center wavelength of 463 nm to 467 nm are arranged in arithmetic increments from left to right. It can be seen that the maximum color difference ΔE 2000 is about 2.5 through regularly arranging the blue laser light sources. FIG. 5B is a diagram showing the color difference of the final displayed image when the above simplified calculation is used and the blue laser light sources with the center wavelength of 463 nm to 467 nm are randomly arranged. It can be seen that the maximum color difference ΔE 2000 of the final image is about 1.4 through randomly arranging the blue laser light sources. Therefore, it is effective and feasible to perform simplified calculations by randomly arranging the light source units in the light source array and using a determined light source characteristic matrix.

It can be seen from FIGS. 5A and 5B that if the same light source characteristic matrix $C_0$ is used for simplifying calculation, although the color difference is reduced, the color difference still exists. In a third embodiment, as a variation of FIG. 5B, the diffusion degree of the scattering region in the wavelength conversion device is increased to make the diffusion degree not lower than the fluorescence diffusion degree of the wavelength conversion region, thereby enhancing the wavelength superposition effect. There are many ways to increase the diffusion degree of the scattering layer, for example, changing the properties of the scattering particles, such as concentration and size. However, if the blue light diffusion is too large, the crosstalk between the partitions will lead to the reduction of the energy saving effect of the laser light source and the reduction of the area of the uniform light field. In some embodiments, the diffusion degree of the scattering region of the wavelength conversion device is the same as or similar to the fluorescence diffusion degree of the wavelength conversion region.

Figure 6A:
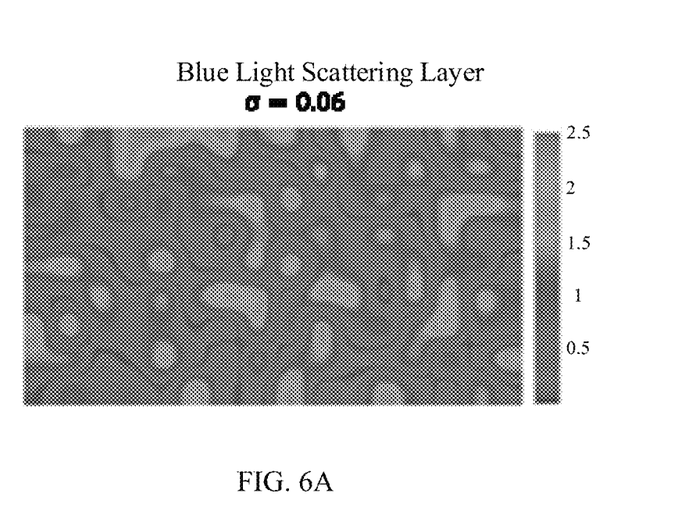
FIGS. 6A and 6B are graphs showing a color difference of the display image when a Gaussian diffusion of a blue light scattering layer is $\sigma=0.06$ and the Gaussian diffusion of the blue light scattering layer is $\sigma=0.12$.
Figure 6B:
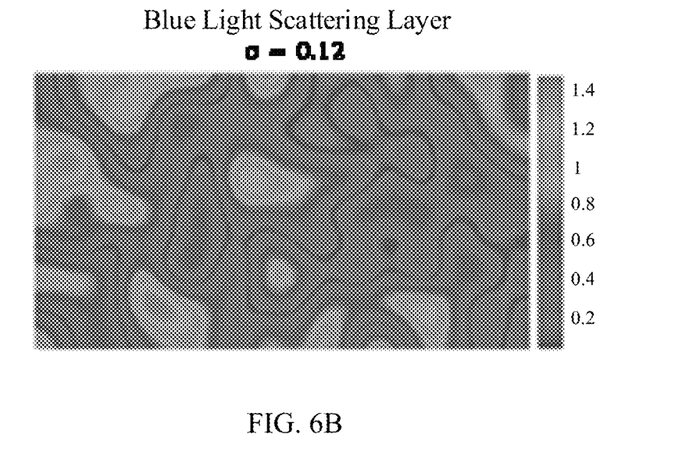

FIGS. 6A and 6B are graphs showing the color difference of the displayed image when a blue light scattering layer has a Gaussian diffusion σ=0.06 and the blue light scattering layer has a Gaussian diffusion σ=0.12. In FIG. 6A, when the blue light scattering layer has a Gaussian diffusion σ=0.06, the image display is realized by the technical means of randomly arranging the light source array and using the same light source characteristic matrix $C_0$ for simplifying calculation. In this case, the maximum color difference ΔE 2000 of the maximum final displayed image is about 2.5. In FIG. 6B, the blue light scattering layer has a Gaussian diffusion σ=0.12. At this time, the diffusion degree of the scattering layer is close to that of the fluorescence diffusion layer. Next, the image display is realized by the technical means of randomly arranging the light source array and using the same light source characteristic matrix $C_0$ for simplified calculation. In this case, the maximum color difference ΔE 2000 of the maximum final displayed image is about 1.4, compared with the use of a scattering region with a smaller diffusion degree, the color difference is effectively reduced. Therefore, it is effective and feasible to randomly arrange the light source units in the light source array, use a scattering layer with a larger diffusion degree, and then use a determined light source characteristic matrix to simplify calculations.

In an embodiment, the dynamic control module includes: a color correction part, a local dimming part, a display modulation part, and a light source modulation part. The color correction part is configured to obtain a light source correction signal through a white balance correction according to the chromaticity information and the maximum brightness information of each of the light source units, and the light source correction signal includes a brightness value of each light source unit group when the light source unit groups achieves a maximum brightness white point. The local dimming part is configured to obtain a local dimming signal of the light source system according to the image signal and the light source correction signal. The display modulation part is configured to obtain the light spot modulation signal according to the image signal, the light source correction signal and the local dimming signal. The light source modulation part is configured to obtain the current modulation signal of the light source system according to the local dimming signal, the light source correction signal and the correlation curve between the modulation current and the brightness of each of the light source units.

In an embodiment, the local dimming part is configured to calculate a brightness modulation signal of each color according to the image signal and a color gamut combined by at least two of the light source units of respective colors within a corresponding one of the I×J sub-regions, to take a maximum value of the brightness modulation signal of each color as a target brightness value of each dimming region of each display unit, so as to obtain the local dimming signal of the light source system according to the light source correction signal again.

In an embodiment, each of the light source unit groups includes light at least two of the source units that have at least two colors, and is a minimum unit capable of achieving a white point spatially.

In an embodiment, the color correction part is further configured to balance the maximum brightness with which each of the light source unit groups is capable of achieving white point in such a manner that each part of an image has a uniform brightness when the display system displays a full white field.

In an embodiment, the at least two of the light source units of respective colors within the corresponding sub-region are a light source unit emitting light with a maximum wavelength and a light source unit emitting light with a minimum wavelength in the sub-region.

In an embodiment, each of the I×J sub-regions of the light source array is configured for a primary illumination of one of a plurality of image partitions of an image to be displayed, each of the plurality of image partitions comprises a plurality of pixels, the display unit comprises a plurality of dimming regions corresponding to the plurality of image partitions in one-to-one correspondence.

In an embodiment, the light source array is one of an electroluminescent sheet array, a cold cathode fluorescent lamp array and a light emitting diode array, and the display unit is a liquid crystal panel.

In an embodiment, the light source array is one of a laser light source array and a light emitting diode array, and the display unit is a spatial light modulator.

In an embodiment, the light source system further includes a wavelength conversion device disposed on an optical path between the light source array and the display device, and the wavelength conversion device comprises a wavelength conversion region configured to absorb at least part of light emitted from the light source array and to emit excited light.

In an embodiment, the light source array is arranged randomly.

In an embodiment, the wavelength conversion device further includes a scatting region.

In an embodiment, the scattering region has a diffusion degree not lower than that of the wavelength conversion region.

In an embodiment, a chromaticity coordinate value of one of the light source units of the excited light is a certain fixed value taken within its chromaticity range, and the chromaticity information of the light source unit includes the chromaticity coordinate value of the light source unit.

In an embodiment, a chromaticity coordinate value of one of the light source units of the light source array is a certain fixed value taken within its chromaticity range, and the chromaticity information of the light source unit comprises the chromaticity coordinate value of the light source unit.

In an embodiment, the display system further includes a light homogenizing device arranged between the light source system and the display unit and configured to homogenize the light beams emitted by the light source system.

The above are only some embodiments of the present disclosure, and do not limit the scope of the present disclosure. Any equivalent structure or equivalent process variation made according to the content of the description and drawings of the present disclosure, applied directly or indirectly in other relevant technical fields, is included in the scope of patent protection of the present disclosure.

The invention claimed is:
1. A display system, comprising:
a light source system comprising a light source array formed from light source units, the light source array being configured to emit light beams and being divided into I×J sub-regions;
a display unit disposed on a light emergent path of the light source system and configured to modulate a light spot on a surface thereof based on a light spot modulation signal to generate image light; and
a dynamic control module configured, based on an image signal and dynamically updated information of the light source units including chromaticity information, maximum brightness information, and a correlation curve between a modulation current and a brightness, to obtain the light spot modulation signal and a current modulation signal for modulating the light source system,
wherein the dynamic control module comprises:
a color correction part configured to obtain a light source correction signal through a white balance correction based on the chromaticity information and the maximum brightness information of each of the light source units, wherein the light source correction signal comprises a brightness value of each light source unit group of the light source unit groups when the light source unit group achieves a maximum brightness white point, wherein the light source unit groups are formed by the light source units;
a local dimming part configured to obtain a local dimming signal of the light source system based on the image signal and the light source correction signal;
a display modulation part configured to obtain the light spot modulation signal based on the image signal, the light source correction signal and the local dimming signal; and
a light source modulation part configured to obtain the current modulation signal of the light source system based on the local dimming signal, the light source correction signal and the correlation curve between the modulation current and the brightness of each of the light source units; and
wherein the color correction part is further configured to balance the maximum brightness with which each light source unit group of the light source unit groups is capable of achieving white point in such a manner that each part of an image has a uniform brightness only when the display system displays a full white field.

2. The display system according to claim 1, wherein at least two light source units of the light source units are arranged in each of the I×J sub-regions, and have at least two colors; the local dimming part is configured to calculate a brightness modulation signal of each of the at least two colors based on the image signal and a color gamut combined by the at least two light source units of the at least two colors within a corresponding sub-region of the I×J sub-regions, to take a maximum value of the brightness modulation signal of each of the at least two colors as a target brightness value of each dimming region of each display unit, so as to obtain the local dimming signal of the light source system based on the light source correction signal again.

3. The display system according to claim 1, wherein each light source unit group of the light source unit groups comprises at least two of the light source units that have at least two colors, and is a minimum unit capable of achieving a white point spatially.

4. The display system according to claim 2, wherein the at least two light source units of the at least two colors within the corresponding sub-region are light source units of the at least two colors that each are configured to emit light with a maximum wavelength within the corresponding sub-region and light source units of the at least two colors that each configured to emit light with a minimum wavelength in the corresponding sub-region.

5. The display system according to claim 1, wherein each of the I×J sub-regions of the light source array is configured for primary illumination of one of a plurality of image partitions of an image to be displayed, wherein each of the plurality of image partitions comprises a plurality of pixels, and wherein the display unit comprises a plurality of dimming regions corresponding to the plurality of image partitions in one-to-one correspondence.

6. The display system according to claim 1, wherein the light source array is one of an electroluminescent sheet array, a cold cathode fluorescent lamp array and a light emitting diode array, and wherein the display unit is a liquid crystal panel.

7. The display system according to claim 1, wherein the light source array is one of a laser light source array and a light emitting diode array, and wherein the display unit is a spatial light modulator.

8. The display system according to claim 1, wherein the light source system further comprises a wavelength conversion device disposed on an optical path between the light source array and the display unit, wherein the wavelength conversion device comprises a wavelength conversion region configured to absorb at least part of light emitted from the light source array and to emit excited light.

9. The display system according to claim 8, wherein the light source array is arranged randomly.

10. The display system according to claim 8, wherein the wavelength conversion device further comprises a scattering region.

11. The display system according to claim 10, wherein the scattering region has a diffusion degree not lower than that of the wavelength conversion region.

12. The display system according to claim 8, wherein a chromaticity coordinate value of one of the light source units of the excited light is a certain fixed value taken within its chromaticity range, and wherein the chromaticity information of the light source unit comprises the chromaticity coordinate value of the light source unit.

13. The display system according to claim 1, wherein a chromaticity coordinate value of one of the light source units of the light source array is a certain fixed value taken within its chromaticity range, and wherein the chromaticity information of the light source unit comprises the chromaticity coordinate value of the light source unit.

14. The display system according to claim 1, further comprising:
a light homogenizing device disposed between the light source system and the display unit and configured to homogenize the light beams emitted by the light source system.

15. The display system according to claim 3, wherein each light source unit group of the light source unit groups comprises a red laser light source unit, a green laser light source unit and a blue laser light source unit that are adjacent to each other, and is capable of achieving the white point through a light combining device.

16. A display system, comprising:
a light source system comprising a light source array formed from light source units, the light source array being configured to emit light beams and being divided into I×J sub-regions, wherein at least two light source units of the light source units are arranged in each of the I×J sub-regions, and have at least two colors;
a display unit disposed on a light emergent path of the light source system and configured to modulate a light spot on a surface thereof based on a light spot modulation signal to generate image light; and
a dynamic control module configured, based on an image signal and dynamically updated information of the light source units including chromaticity information, maximum brightness information, and a correlation curve between a modulation current and a brightness, to obtain the light spot modulation signal and a current modulation signal for modulating the light source system,
wherein the dynamic control module comprises:
a color correction part configured to obtain a light source correction signal through a white balance correction based on the chromaticity information and the maximum brightness information of each of the light source units, wherein the light source correction signal comprises a brightness value of each light source unit group of light source unit groups when the light source unit group achieves a maximum brightness white point, wherein the light source unit groups are formed by the light source units;
a local dimming part configured to obtain a local dimming signal of the light source system based on the image signal and the light source correction signal, the local dimming signal comprising a local dimming value of each of the light source units;
a display modulation part configured to obtain the light spot modulation signal based on the image signal, the light source correction signal and the local dimming signal, the light spot modulation signal containing modulation amount of the display unit to a light spot of each of the at least two colors; and
a light source modulation part configured to obtain the current modulation signal of the light source system based on the local dimming signal, the light source correction signal and the correlation curve between the modulation current and the brightness of each of the light source units;

wherein each of the I×J sub-regions of the light source array is configured for primary illumination of one of a plurality of image partitions of an image to be displayed, wherein each of the plurality of image partitions comprises a plurality of pixels, and wherein the display unit comprises a plurality of dimming regions corresponding to the plurality of image partitions in one-to-one correspondence; and wherein the color correction part is further configured to balance the maximum brightness with which each light source unit group of the light source unit groups is capable of achieving white point in such a manner that each part of an image has a uniform brightness only when the display system displays a full white field.

17. The display system according to claim 16, wherein the local dimming part is configured to calculate a brightness modulation signal of each of the at least two colors based on the image signal and a color gamut combined by the at least two light source units of the at least two colors within a corresponding sub-region of the I×J sub-regions, to take a maximum value of the brightness modulation signal of each of the at least two colors as a target brightness value of each dimming region of each display unit, so as to obtain the local dimming signal of the light source system based on the light source correction signal again.

18. The display system according to claim 16, wherein each light source unit group of the light source unit groups comprises at least two of the light source units that have at least two colors, and is a minimum unit capable of achieving a white point spatially.

19. The display system according to claim 17, wherein the at least two light source units of the at least two colors within the corresponding sub-region are light source units of the at least two colors that each are configured to emit light with a maximum wavelength within the corresponding sub-region and light source units of the at least two colors that each configured to emit light with a minimum wavelength in the corresponding sub-region.

20. The display system according to claim 16, wherein a chromaticity coordinate value of one of the light source units of the light source array is a certain fixed value taken within its chromaticity range, and wherein the chromaticity information of the light source unit comprises the chromaticity coordinate value of the light source unit.

* * * * *